United States Patent
Bligh et al.

(10) Patent No.: US 9,727,848 B2
(45) Date of Patent: Aug. 8, 2017

(54) FIELD PROGRAMMABLE HIERARCHICAL CLOUD BILLING SYSTEM

(71) Applicants: Alex Bligh, London (GB); Gihan Munasinghe, London (GB)

(72) Inventors: Alex Bligh, London (GB); Gihan Munasinghe, London (GB)

(*) Notice: Subject to any disclaimer, the term of this patent is extended or adjusted under 35 U.S.C. 154(b) by 137 days.

(21) Appl. No.: 13/937,609

(22) Filed: Jul. 9, 2013

(65) Prior Publication Data

US 2014/0324650 A1  Oct. 30, 2014

Related U.S. Application Data

(60) Provisional application No. 61/817,102, filed on Apr. 29, 2013.

(51) Int. Cl.
| | |
|---|---|
| *G06Q 20/14* | (2012.01) |
| *G06Q 30/04* | (2012.01) |
| *G06Q 30/06* | (2012.01) |

(52) U.S. Cl.
CPC ......... *G06Q 20/145* (2013.01); *G06Q 20/14* (2013.01); *G06Q 30/04* (2013.01); *G06Q 30/0601* (2013.01)

(58) Field of Classification Search
CPC ...... G06Q 20/14; G06Q 20/145; G06Q 30/04; G06Q 30/0601
See application file for complete search history.

(56) References Cited

U.S. PATENT DOCUMENTS

| | | | | |
|---|---|---|---|---|
| 8,402,139 | B2* | 3/2013 | Ferris et al. | 709/226 |
| 8,509,226 | B1* | 8/2013 | Murphy et al. | 370/352 |
| 8,924,469 | B2* | 12/2014 | Raleigh | H04L 12/5691 455/406 |
| 2001/0051928 | A1* | 12/2001 | Brody | 705/52 |
| 2004/0003390 | A1* | 1/2004 | Canter et al. | 717/178 |
| 2005/0091157 | A1* | 4/2005 | Suzuki et al. | 705/40 |
| 2006/0174078 | A1* | 8/2006 | Robison | 711/163 |
| 2006/0230452 | A1* | 10/2006 | Field | 726/22 |
| 2007/0192839 | A1* | 8/2007 | Fee et al. | 726/4 |
| 2009/0292654 | A1* | 11/2009 | Katiyar et al. | 705/412 |
| 2010/0049637 | A1* | 2/2010 | Laventman | G06Q 10/06 705/30 |
| 2011/0093101 | A1* | 4/2011 | Casagrande | 700/94 |
| 2012/0016778 | A1* | 1/2012 | Salle et al. | 705/27.1 |
| 2012/0116831 | A1* | 5/2012 | Greenspan et al. | 705/7.22 |
| 2012/0158821 | A1* | 6/2012 | Barros | G06F 17/30563 709/203 |
| 2012/0271660 | A1* | 10/2012 | Harris et al. | 705/4 |
| 2012/0331441 | A1* | 12/2012 | Adamson | 717/102 |
| 2013/0060839 | A1* | 3/2013 | Van Biljon et al. | 709/203 |
| 2013/0111027 | A1* | 5/2013 | Milojicic et al. | 709/225 |
| 2013/0179414 | A1* | 7/2013 | Hoogerwerf et al. | 707/694 |
| 2013/0185413 | A1* | 7/2013 | Beaty et al. | 709/224 |
| 2013/0196615 | A1* | 8/2013 | Zalmanovitch et al. | 455/405 |
| 2013/0227710 | A1* | 8/2013 | Barak et al. | 726/29 |
| 2013/0282540 | A1* | 10/2013 | Bliesner | G06Q 30/04 705/34 |

* cited by examiner

*Primary Examiner* — Asfand Sheikh
(74) *Attorney, Agent, or Firm* — Morgan, Lewis & Bockius LLP

(57) ABSTRACT

A billing method is received and authenticated; the billing method includes a function or procedure for computing a bill for the usage of cloud-based computing resources.

21 Claims, 7 Drawing Sheets

FIELD PROGRAMMABLE HIERARCHICAL CLOUD BILLING SYSTEM

CROSS-REFERENCE TO RELATED APPLICATIONS

This application claims priority to and the benefit of U.S. Provisional Patent Application Ser. No. 61/817,102, filed on Apr. 29, 2013, which is hereby incorporated herein by reference in its entirety.

TECHNICAL FIELD

Embodiments of the present invention relate generally to billing and, more specifically, to the billing of customers for the use of cloud-based computing resources.

BACKGROUND

Cloud computing refers to the use of remote computing resources (hardware and/or software) that are delivered as a service over a network (typically, the Internet). It entrusts these remote services with a user's data, software, and/or computational needs. For wide-area connectivity, users can use either the Internet or carrier clouds (i.e., dedicated virtual private networks) to access these resources where their data and often software is stored via a web browser, a light-weight desktop, mobile application or programmatically using an Application Programming Interface ("API") call. Cloud computing providers may offer their services according to several fundamental models, such as infrastructure as a service ("IaaS"), platform as a service ("PaaS"), and software as a service ("SaaS"). One attribute of cloud computing is a usage model in which customers consume resources as a service and pay only for what they use, rather than buying a license, maintenance contract, and/or renting dedicated resources on a periodic basis. Another attribute of cloud computing is a multi-tenancy approach to resource sharing: multiple customers or organizations ("tenants") may share the same application, running on the same operating system, on the same hardware, with the same data-storage mechanism, and/or run different applications on different operating systems using virtual hardware but sharing the same physical hardware; in each case, however, they may not share or see each other's data. Often cloud computing resources are sold through resellers, with the cloud computing provider providing the reseller with the ability to bill its tenants or billing its tenants directly and providing the reseller with a percentage of the bills produced or collected.

Existing systems, however, provide little flexibility in the ability of the cloud computing provider or resellers of the cloud resources (each a 'billing entity') to customize, change, or otherwise modify their billing methods. A reseller may be able to configure preset parameters of billing, for example, if a parent billing entity has provided for such configuration; the reseller, however, may wish to bill for usage in a manner not provided or anticipated by a parent billing entity. A reseller may further wish to include additional products or services along with the cloud-based resources; existing systems do not allow for integrated billing of the entire product offered by the reseller. A need therefore exists for a customizable, flexible, and secure method for billing for cloud-based resources.

SUMMARY

In general, various aspects of the systems and methods described herein include the use of billing methods (i.e., functions or procedures implemented in computer code) for the billing of cloud-based computing resources. A master billing entity (being a billing entity at the top of the hierarchy of billing entities which may be the cloud computing provider itself) provides products (e.g., virtual servers, storage, databases, applications or other services) for use by customers or child billing entities and a billing entity provides billing methods in respect of those products. The usage of the products (and/or components therein) by the customers is monitored; the billing methods may transform this monitored data into an amount to be billed via, for example, a fixed formula or a computer program including API calls to the provider system and/or master billing entity. Based on the usage and the particular procedures specified in the billing methods, bills are computed for one or more billing periods. The child billing entities may update their billing methods to include any procedure or function they see fit (including, in some embodiments, other products offered/introduced by the child billing entities). Customers or child billing entities may purchase units of credit to be applied to the bills.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
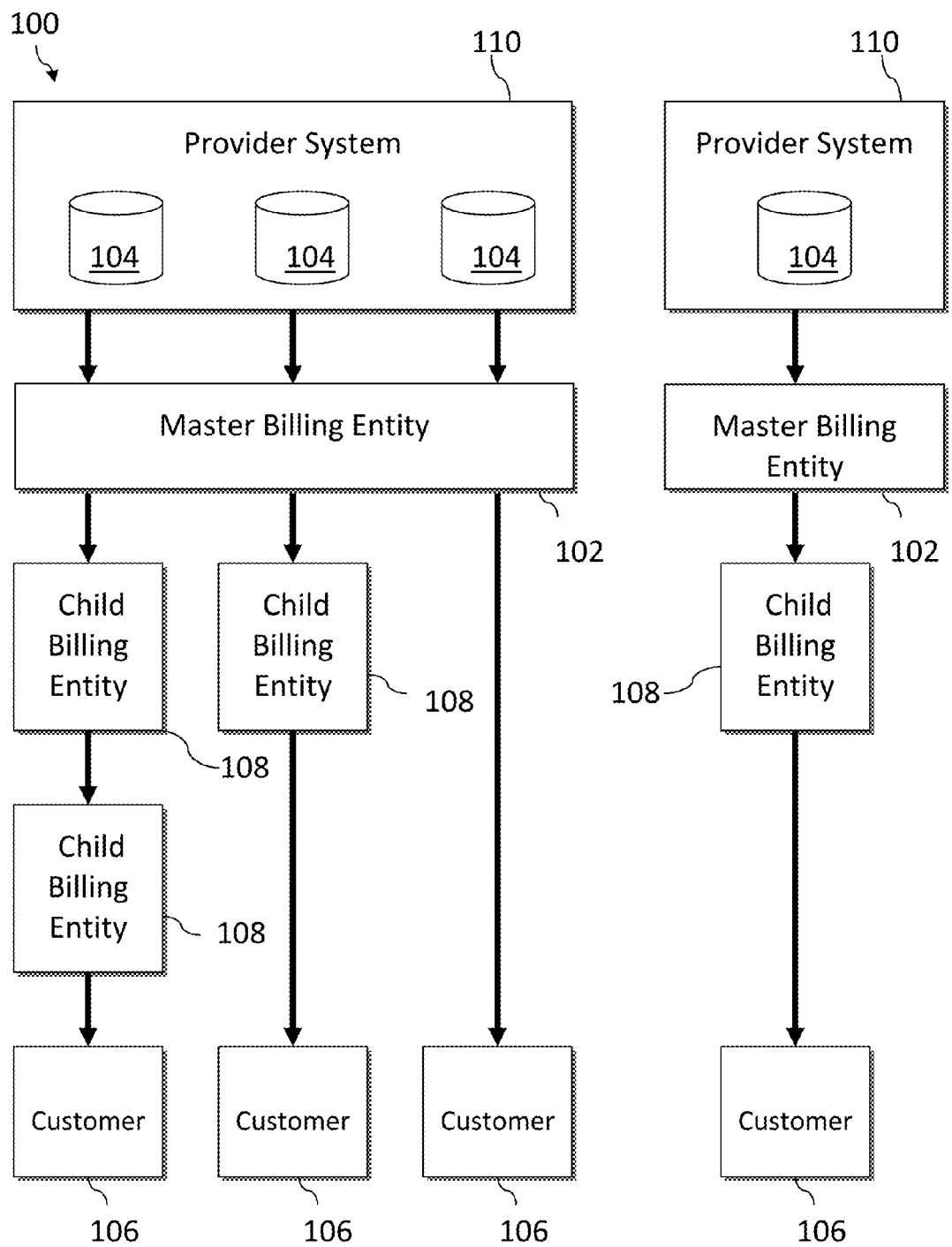
FIG. 1 illustrates a billing environment in accordance with embodiments of the present invention.

Embodiments of the invention described herein include systems and methods for an entity supplying cloud-computing products to bill users of those resources (and/or allow resellers to bill users) in a flexible and customizable way. Referring to FIG. 1, a cloud-billing environment 100 includes one or more master-billing entities 102, which include, monitor, own, lease, are partnered with, or otherwise have access to one or more provider systems 110 that include cloud-computing resources 104. The master-billing entities 100 bill for the use of the products 104 provided by the provider systems 110 to customers 106 and/or child billing entities 108. The child-billing entities 108 may further provide and bill for the use of the products 104 to customers 106 and/or other child billing entities 108. The products 104 may be systems such as computer servers, databases or services; the products 104 may represent physical systems or virtual "product types" that represent all or part of one or more physical systems, or applications or computer services running thereon, or configurations thereof. Each product 104 may include one or more "product component types," such as (taking the example of servers) processors (e.g., CPUs), memory (e.g., RAM, ROM, or any other type of memory), storage (e.g., hard-disk drives, solid-state drives, RAID arrays, or any other type of storage), platforms (e.g., operating systems), and/or services (e.g., web sites, software programs, or any other type of service). Each product component type may be associated with one or more "configured values" (e.g., number of CPUs, amount of memory, amount of storage, etc.), "validators" (i.e., descriptions, lists, or ranges of valid configured values), and/or "measured values" (i.e., the amount or number of some resource currently in use, or a quantity of a particular resource utilized to date, such as input/output operations). A "product offer" is a particular set and/or range of one or more products, product components, and/or configured values that is offered to a customer 106 or child billing entity 108. The product offer may further include default values for the configurable values, validators for determining which configured values are allowed (i.e., are set within allowable ranges), and/or a specification of which customers are to be presented with the product offer. A "product purchase" is an accepted product offer that includes particular values selected from the ranges of values specified in the product offer (and approved by the validator).

For example, a product 104 may be a virtual server product, which is provided by use of "compute nodes," each being a computer server having 64 CPUs, 1 TB of RAM, and 16 TB of storage. In this example, the number of CPUs, amount of RAM, and amount of storage are the product components available for this product. A first product offer based on this product may specify a range of 8-16 CPUs, 1-512 GB of RAM, and 2-4 TB of storage as configured values; a second product offer may specify a range of 4-8 CPUs, 8-256 GB of RAM, and 1-2 TB of storage as configured values. Each of these two product offers may be offered to all or a selection of customers and/or child billing entities; a first product purchase based on the first product offer may specify 12 CPUs, 256 GB of RAM, and 2 TB of storage, and a second product purchase based on the second product offer may specify 4 CPUs, 256 GB of RAM, and 2 TB of storage. The two product purchases may share the resources of the product 104 for direct use (by a customer 106) or resale (by a child billing entity 108). This example is not intended to be limiting; any other aspects of a product may be specified as product components and offered to customers. Furthermore, the product components may themselves not be configurable (e.g., a product offer may include a fixed number of CPUs), but the product offer may include a range of prices, billing period lengths, lease-term lengths, or other values to be configured.

Referring again to FIG. 1, the product offers may be offered directly to customers 106 by the master billing entities 102 or may be offered to child billing entities 108 for resale to customers 106 (or for resale to other child billing entities 108). This so-called "multi-tenant" environment 100 may thus create a complicated hierarchy of billing entities 102, 108, before the products 104 are ultimately deployed and accessed by users (i.e., customers 106). The billing entities 102, 108 may be arranged in a tree-like hierarchy such that each billing entity 108 is a child of either a master-billing entity 102 or another child billing entity 108. Embodiments of the present invention include a scalable multi-tenant billing system that, as described in greater detail below, supports these multiple billing entities.

Figure 2A:
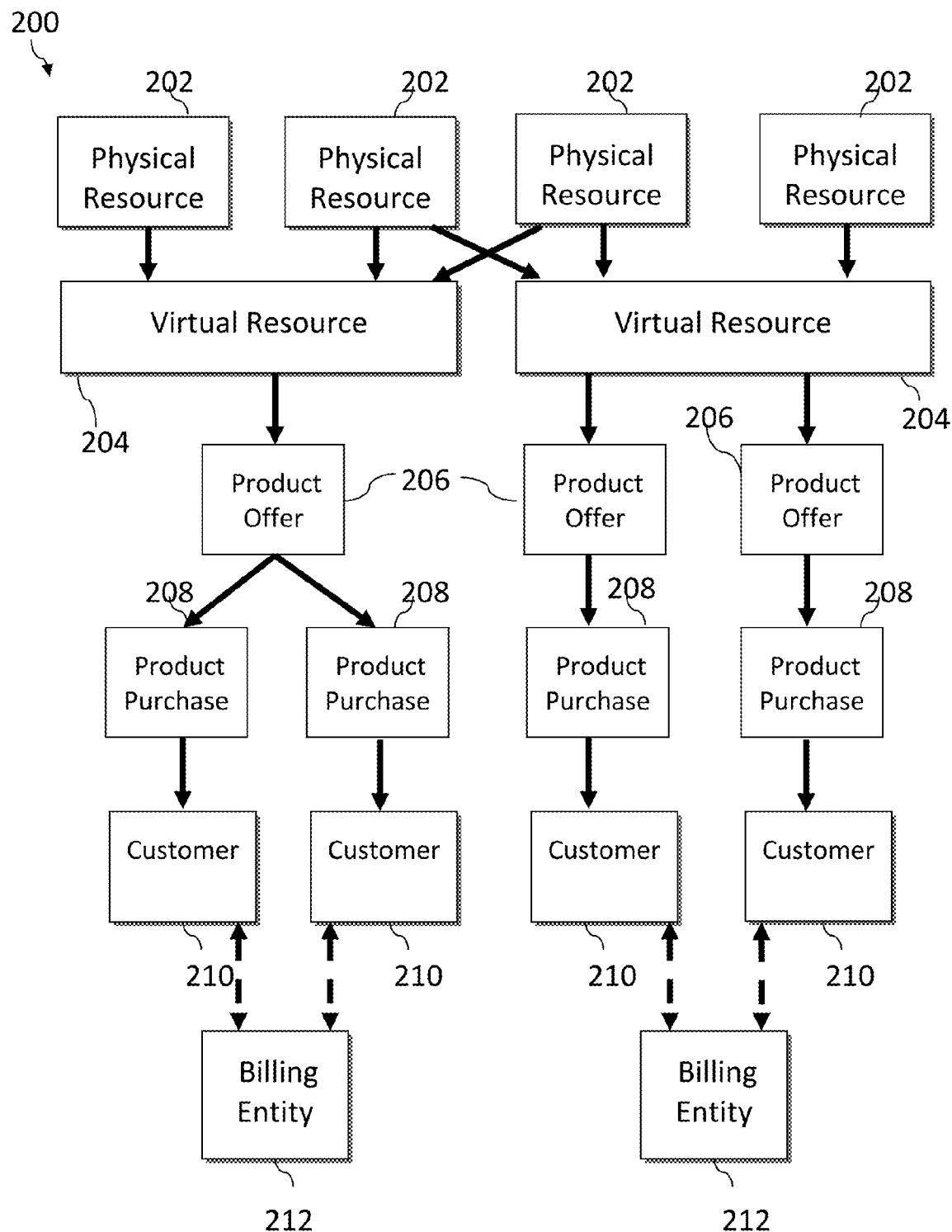
FIG. 2A illustrates a mapping of real-to-virtual resources in accordance with embodiments of the present invention.
Figure 2B:
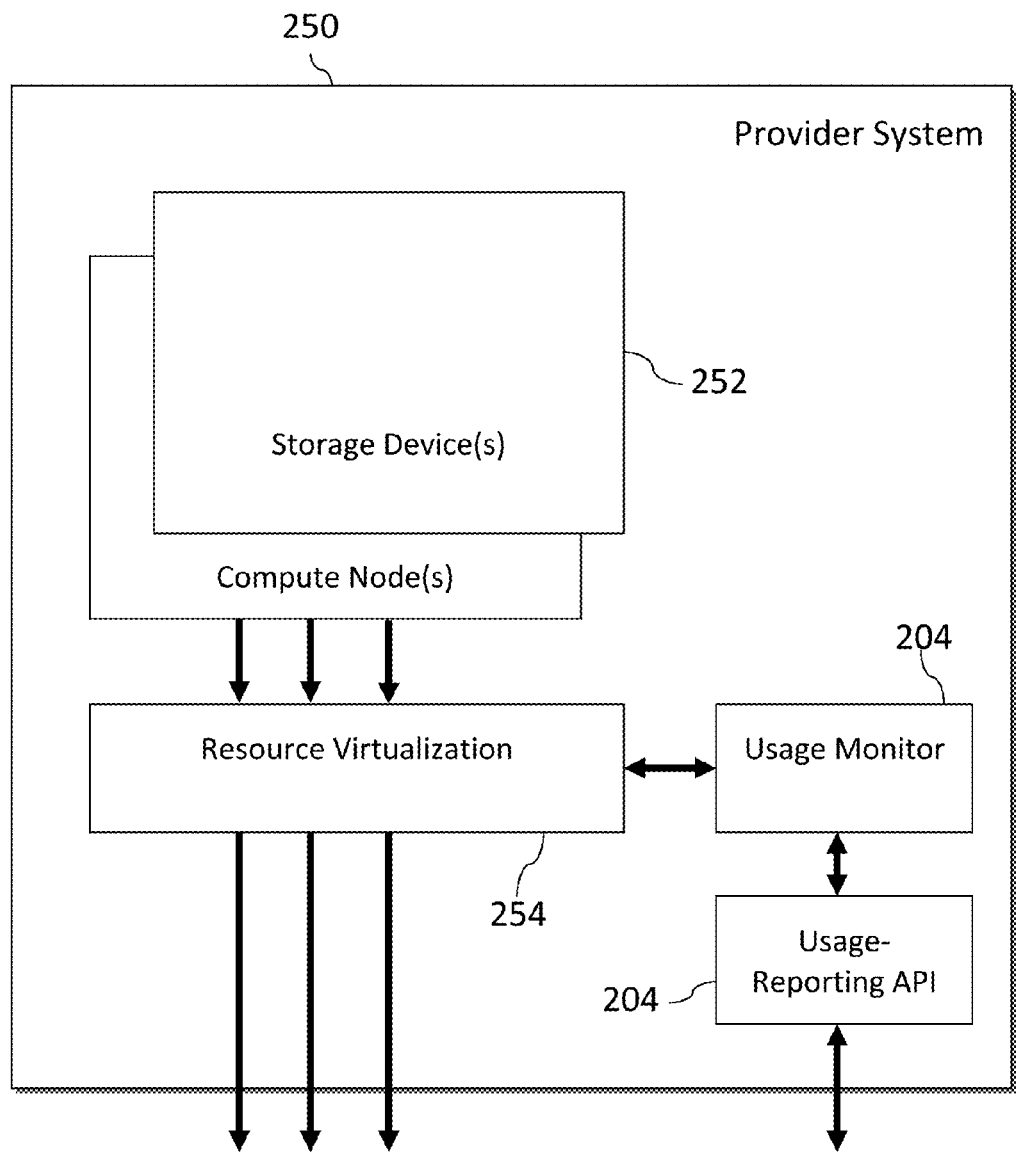
FIG. 2B illustrates a provider system in accordance with embodiments of the present invention.

FIG. 2A illustrates a representative system 200 that maps physical resources 204 (e.g., compute nodes or other physical servers for performing compute operations, storage devices, and/or other such resources) to general types of products sold (i.e., virtual resources 204), such as virtual servers, virtual disks, particular services, database access, and/or or other such product types, to specific instances of their sale together with the commercial terms (i.e., product offers 206), e.g., a virtual server billed by the hour specifying a range of 4-8 CPUs, 8-256 GB of RAM, and 1-2 TB of storage and associated pricing therewith. A physical resource 202 may be used by one or more virtual resources 204. Customers 210 may access the product offers 206 in accordance with each offer's configured values, as described above. The provider system (e.g., the provider of the physical 202 and virtual 204 resources) monitors use of its physical resources 202 and associates this usage with a product purchase 208 in order to provide measurement data in respect of the product purchase for billing purposes in respect of each measured value. One or more billing entities 212 observe the usage data in respect of the relevant product purchases 208 (i.e., the product offers 206 purchased by the associated customer 210 or child billing entities) and the associated the product offers 206 and bill the customers 210 or child billing entities for said usage. In one embodiment, as described further below, the billing of the customers 210 depends upon the customer's usage of individual product components. FIG. 2B illustrates one embodiment of a provider system 250 that includes physical resources 252 (such as one or more compute nodes, servers, storage devices, or other such resources). The provider system 252 virtualizes these resources (i.e., abstracts away the particular hardware and/or software used to implement the physical resources 252) using a resource virtualization module or modules 254, which may be any software, hardware, or firmware for dividing and allocating the physical resources 252 in accordance with product purchases derived therefrom. A usage monitor 256 may be used to monitor the usage of the virtual or physical resources, and an API may be used to pass the usage information to requesting entities. The cloud-billing environment 100 of FIG. 1, the physical-to-virtual resource system 200 of FIG. 2A, and the provider system 250 of FIG. 2B are presented herein as examples only, and the present invention is not limited to any particular size or arrangement of cloud-computing resources, billing entities, or customers. For example, the provider systems 110 may be combined with their respective master billing entities 102.

Referring again to FIG. 1, each billing entity 102, 108 may send bills to customers 106 in accordance with the product offers purchased by, and products used by, the customers 106. The bills may be based on the product offers, by the particular product components configured in the offers, by the customers' usage of the product offers and/or product components and/or the measured values associated therewith, or any combination thereof. A child billing entity 108 may define its own product offers (i.e., set its own pricing plan) based on product offers received from a parent billing entity; these re-defined product offers may include new prices for products in the parent product offer and/or may incorporate additional products provided by the child billing entity 108.

A "measured value," as the term is used herein, refers to a measure of an amount of a customer's usage of a product, product offer, and/or product component. The measured values may be retrieved at any time via application-programming interface ("API") calls to the provider system 110. The provider system 110 may manually and/or automatically control and optimize resource use by leveraging a metering capability at some level of abstraction appropriate to the type of service (e.g., storage, processing, bandwidth, and active user accounts). For example, the provider system 110 may monitor the network bandwidth of a plurality of customers and re-allocate bandwidth to reflect the customers' current demands and usage.

In one embodiment, the pricing of each of the product offers is determined by a "billing method," which may be applied to one or more product offers. A billing method includes a procedure, function, algorithm, or other such instruction or specification that determines, from the values configured for a product offer and/or the values measured for a customer's usage of a product offer and/or other inputs (for instance time of day or the result of making API calls), a charge applicable to customer's or child billing entity's use of the product or product components. For example, the billing method may specify a certain charge per hour of use of each of the product's CPUs, memory, and storage; the total charge may vary with number/amount of the resource used, time of day or year, performance or quality of components, or any other such factors. The billing method may further specify a billing period (i.e., an elapsed time period between the current and previous invocation of the billing method). For example, an invoked billing method may multiply the total elapsed minutes since the last invocation by a unit cost per gigabyte per minute (a configured value derived from a billing method) and by the number of gigabytes actually in use (a measured value derived from the product component type).

As described above, a child billing entity 108 may purchase one or more product offers from the master billing entity 102 or another child billing entity 108. In some embodiments, a child billing entity 108 creates a more customized product offer before reselling to a customer 106. Forms of customization may include, but are not limited to, the commercial terms (including a pricing plan) on which the product offers are resold, the type/level of customer support offered for the product purchase, changing/adapting the product offer to accommodate differences in customers to which the product is offered, the look and feel of the application (to, e.g., match a customer's or billing entity's corporate branding), supporting an extensible data model to give customers the ability to customize the data elements managed by an application to meet their specific needs, and/or letting each customer independently customize capabilities (e.g., access rights and restrictions) for specific groups or users. A billing method may be associated with one or more product offers. A parent billing entity may bill one or more child billing entities for resources used based on one set of billing methods, while each of these child billing entities may in turn bill one or more of their customers or grandchild billing entities for these same resources based on a set of billing methods possibly different from that of their parent billing entity. Each billing method may be shared by multiple product offers, either created by the same billing entity that owns the billing method or by another billing entity.

Figure 3:
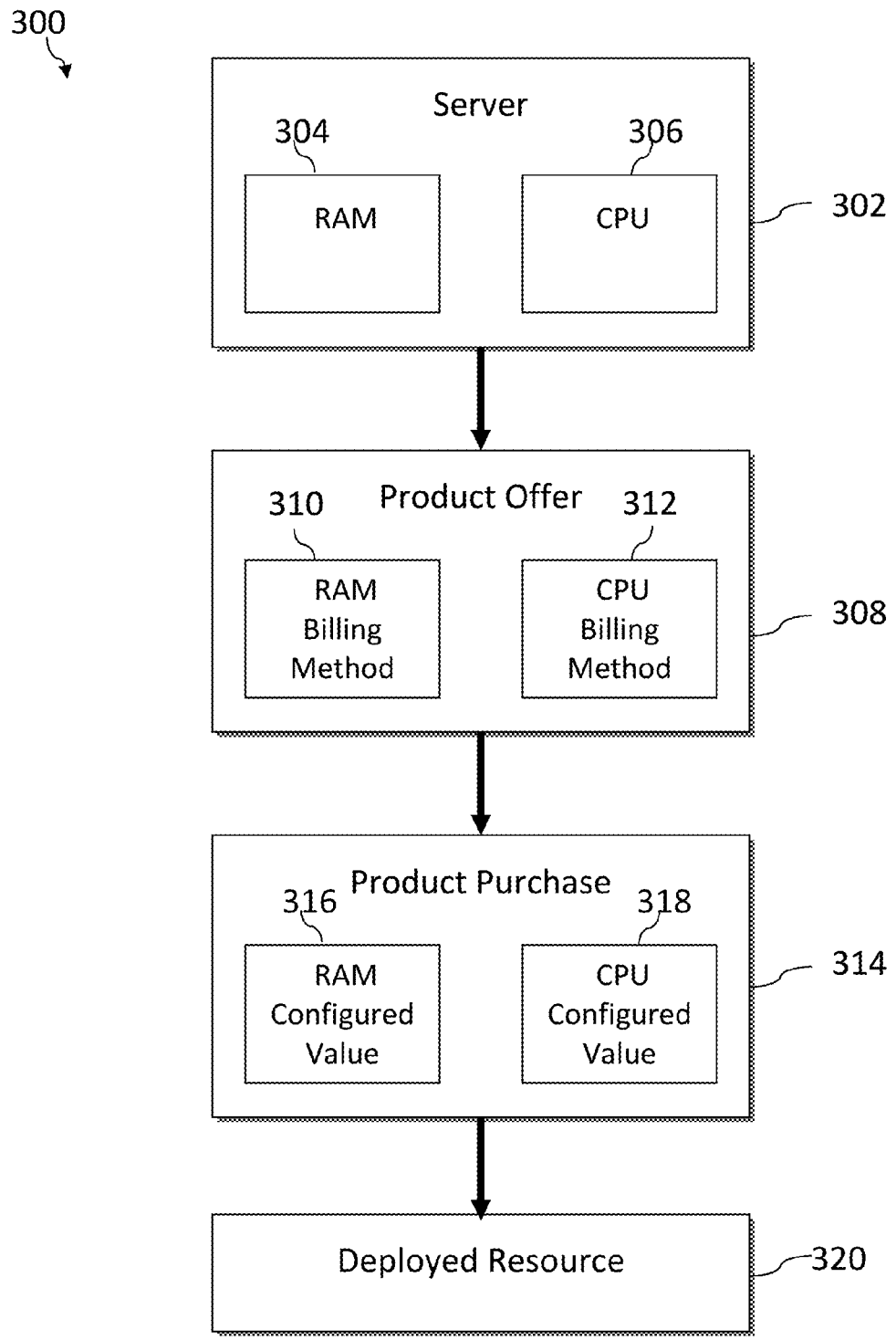
FIG. 3 illustrates a mapping of a resource to a product offer, product purchase, and deployed resource in accordance with embodiments of the present invention.

FIG. 3 illustrates an example of a billing environment 300. A server 302 is illustrated by way of example of a product to be offered; the server 302 may be classified as being a particular type of resource/product (other resource types may include, for example, databases, services, or storage). In this example, the server 302 includes configurable memory (RAM 304) and processing power (CPU 306). A master billing entity may offer a product offer 308 based on the server 302; the product offer 308 may include (or otherwise be associated with) a RAM billing method 310 and a CPU billing method 312 as well as other values, such as billing period availability and/or validators. The product offer 308 may be accepted by a child billing entity or customer as a product purchase 314; the product purchase 314 includes configured values for RAM 316 and CPU 318 and is deployed as a resource 320.

In one embodiment, a billing method associated with a product offer or purchase executes in a billing system (as implemented by, e.g., a parent and/or master billing entity). The billing system executes the computer code contained in the billing method in a secure environment (i.e., a "sandbox") to thereby restrict some of the features, resources, and/or information available in the billing system from access by the billing method and/or to protect the billing system from intentional or unintended harm from the billing method. The sandbox further allows a master or child billing entity to change the manner in which a customer or child billing entity is billed for products or product components without interaction from a provider system and/or parent billing entities. Further, the sandbox allows a child billing entity to design novel billing methods specific to the child billing entity's business requirements, which it may in turn offer to grandchild billing entities.

Figure 4:
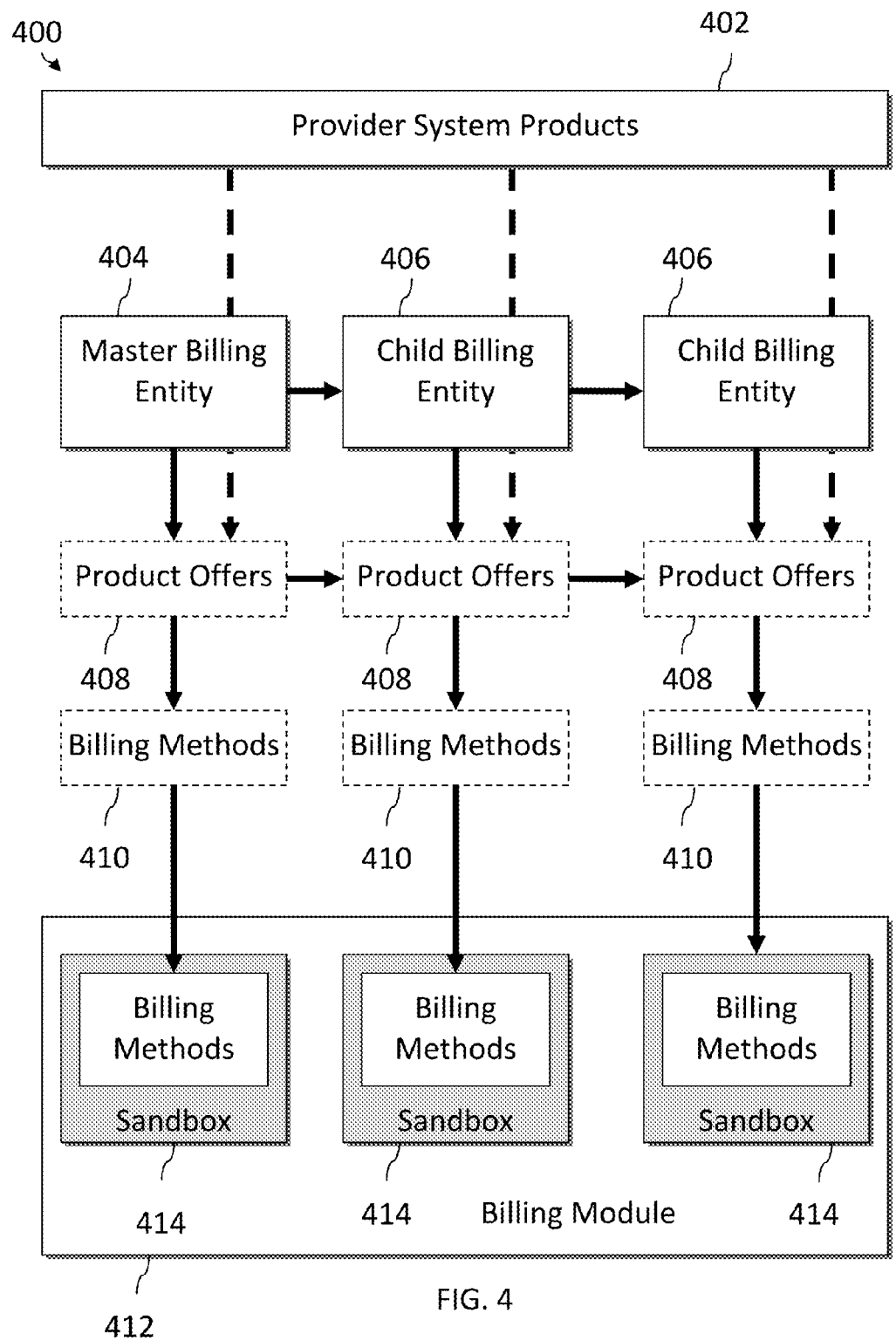
FIG. 4 illustrates a billing environment including billing sandboxes in accordance with embodiments of the present invention.

FIG. 4 illustrates a billing environment 400 that includes products 402, a master billing entity 404, and child billing entities 406 (which are children of the master billing entity 404 or of each other). As described above, the master billing entity 404 provides product offers 408 based on the products 402 to the child billing entities 406 or directly to customers. The master billing entity 404 and/or the child billing entities 406 may create billing methods 410 based on the product offers 408 (and/or product purchases based thereon). A billing module 412 receives the billing methods 410 and runs them in sandboxes 414. The billing methods 410 may receive information regarding measured values of customer usage of the products 402 from data supplied by the Provider System Products 402 and/or via, for example, API calls to the Provider System 402, the Billing Module 412, or other software subsystems including external software.

A given product purchase (and usage of associated product components), therefore, may be billed by multiple billing entities at different levels of hierarchy in the billing environment 400. Each billing entity may independently create, configure, or re-configure a billing method associated with the entity at each level of hierarchy. In one embodiment, a child billing entity may not even inform a parent billing entity regarding changes in the billing methods applicable to the child's children or customers. For example, a master billing entity may create a first billing method for a product offer to a child billing entity; the child may create a second billing method for the same product offer for re-sale to a customer. The billing module 412 may receive both billing methods and compute bills for both the child billing entity and the customer. The child billing entity may modify the second billing method without the approval of the master billing entity; in other embodiments, the master billing entity may view, modify, or otherwise access the second billing method (though other non-parent entities may be prohibited from doing so).

The billing methods 410 may be written in any computing language, scripting language, or other means of describing procedures, functions, or algorithms, such as C, C++, Java, Perl, Python, Bash, Lua, server-side JavaScript, or any similar language or script. They may be transmitted to the billing module 412 as source code, object code, bytecode, or compiled code (e.g., object or executable files). If transmitted as source code, the billing module may be responsible for compiling or translating the billing method into executable form as bytecode or compiled code in a manner compatible with the sandbox. The billing module 412 may include standard library files for or in each sandbox 414 with common functions, libraries, or API calls; these standard library files (and/or their header files, specifications, or other documentation) may be provided to the billing entities. The library files may include, for example, common algorithms for receiving and processing the measured values relevant to the products 402. In one embodiment, a custom programming language is provided to the billing entities for use in programming the billing methods 410.

The sandboxes 414 may be configured to prevent the different billing methods 410 from communicating with each other, identifying each other's customers (or parent/child billing entities), viewing each other's input and output measured values, detecting rate or usage information related to the products 402, or other similar secure items. The sandboxes 414 may further prevent the billing methods 410 from accessing other aspects of the billing module 412 (and/or the system on which it executes), such as operating system files or functions. The sandboxes 414 may further restrict access to internal or external API calls, and provide limits to the amount of CPU, RAM, or other system resources made available to the billing method. Such limitations may be applied at time of execution, and/or (if the billing methods are provided in source code form) at time of compilation or translation into executable form. In one embodiment, the billing methods 410 are visible or otherwise accessible to only parent and/or child billing entities (or customers) or such subset thereof as is selected by the creator of the billing method.

In one embodiment, the billing module 412 verifies or otherwise validates the billing methods 410 upon receipt thereof, before execution, and/or periodically after or during execution. The verification process may include checking for syntax or procedural errors. In one embodiment, the verification process may include checking that a cryptographic signature of the billing method provided determines that the billing method has been signed by a party trusted by the cloud service provider. In one embodiment, the billing module 412 conducts trial runs of the billing methods 410 and checks their output against typical or reasonable billing rates in order to detect errors—for example, if a billing method 410 produces a billing rate above or below a range of reasonable values for a set of usage data, the billing module 412 may reject the billing method 410 and/or send an appropriate error message to the issuing billing entity. In one embodiment, the billing module 412 uses an initial call or trial run in order to retrieve parameters relating to the billing method 410 such as the list of configured values and the list of product types with which the billing method 410 may interoperate.

In various embodiments, the billing methods 410 are supplied or created by the master billing entity 404, by one or more of the child billing entities 406, and/or by a third-party software vendor. The master billing entity 404 (or other entity) may provide a library of template billing methods 410 for use with the system 400; these template billing methods 410 may be used as-is or may be modified or customized by a billing entity. A single billing method 410 may include one or more procedures for billing one or more child billing entities and/or customers.

Figure 5:
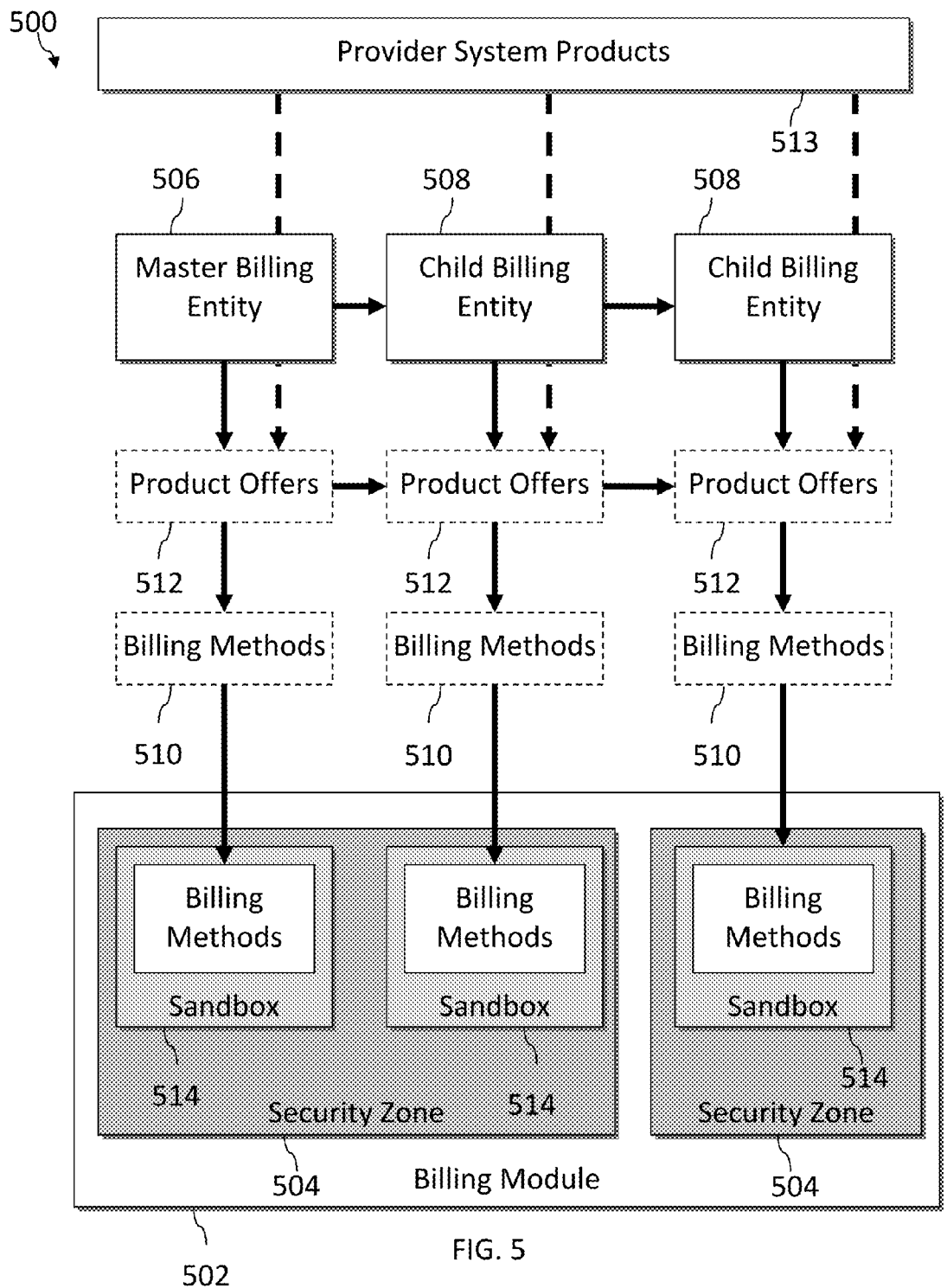
FIG. 5 illustrates a billing environment including security zones in accordance with embodiments of the present invention and FIG. 6 illustrates a system for executing a billing module in accordance with embodiments of the present invention.

In one embodiment, a master billing entity (or other parent billing entity) may authorize the use of a billing method prior to its deployment or use. In the billing environment 500 of FIG. 5, a billing module 502 includes one or more security zones 504, each corresponding to different master billing entities 506 and/or child billing entities 508. The billing entities 506, 508 provide billing methods 510 corresponding to product offers 512 of provider-system products 513 to the billing module 502 for execution within sandboxes 514 therein. Before the billing methods 510 are uploaded or executed by a child billing entity 508, however, the billing method 510 may need to be "signed" or otherwise authenticated by a master billing entity 506 (or other parent billing entity) associated with an associated security zone 504. The signing of the billing method 510 may include a review of the code therein by the master billing entity 516 for errors or un-allowed instructions; if the billing method 510 clears this review, the master billing entity 516 may sign the billing method 510 by, for example, appending a header (or other code) to the billing method 510, creating a value using the SHA or other algorithm and signing the hash with an RSA or other cryptographic key, by signing with an X.509 certificate or similar, or any other means. In another embodiment, the billing method 510 is uploaded to the billing module 502 by the master billing entity 506 and may be authenticated by a method other than signing (by virtue of, for example, a secure connection between the master billing entity 506 and the billing module 502).

The security zones 504 may be used to specify the level of access or control available to the billing methods 510 or child billing entities 508 and to determine what functionality is to be permitted or prohibited within the sandbox environment 514 and any limitations on resource usage by the billing methods running within sandboxes 514 within the billing module 502. For example, the security zones 504 may specify which API, or which features within an API, are available to the child billing entities 508 for accessing the billing module 512 and/or available to the billing methods 510 for accessing the billing module 512 (to, for example, request measured values related to the products offered/monitored by the billing method 510). The security zones 504 may also specify with which credentials the associated billing methods 510 are run (e.g., level of access to the billing module 502).

In one embodiment, billing is performed by the billing module 502 on a product-purchase-per-resource basis. As described above, products (and product components defined therein) are subscribed to when individual resources are configured by means of a product purchase. The billing module 502 analyzes each product-purchase record and, for each product component type within the product purchase, accesses the particular billing details contained in the associated product offer. The billing module 502 then executes the associated billing method 510 using the measured values ascertained from the underlying resource (which in turn have been collected by the billing module 504 via, for example, API calls to the provider-system products), the stored configured values. The billing method 510 may then execute any algorithmic calculation(s) contained therein, which may include gathering data inputs from elsewhere (by API call or otherwise), and returns an amount to charge and, in some embodiments, a textual description for the record of transactions. In one embodiment of the present invention, the billing method 510 is unit-based rather than currency-based—that is, the bills are calculated using abstract "units" of instead of actual currency (e.g., dollars or Euros). A customer or child billing entity may purchase the units from the billing entity using the billing system 500 via, for example, a product offer that describes a purchase of units for a given amount of currency.

Unit-based billing provides the option to abstract currency-based transactions from the usage of resources and/or provide discounts for larger amounts of units purchased. This billing system and method may therefore provide volume-based discounting in the purchase of units without having to incorporate this purchase into the pricing of each product or product offer. This billing system further allows the possibility of each billing entity within the hierarchy charging for the same number of units, allowing a single billing method to be used, but allowing each billing entity within the hierarchy to take a margin by pricing the purchase of units differently in currency terms. A master or child billing entity may therefore re-configure or otherwise adjust the billing rate of the units independently of the products or product offers. In one embodiment, each child billing entity is billed by its parent dependent upon the number of units expended by the customers of the child billing entity. In another embodiment, each child billing entity is billed by its parent dependent upon the number of units purchased by the customers of the child billing entity.

Figure 6:
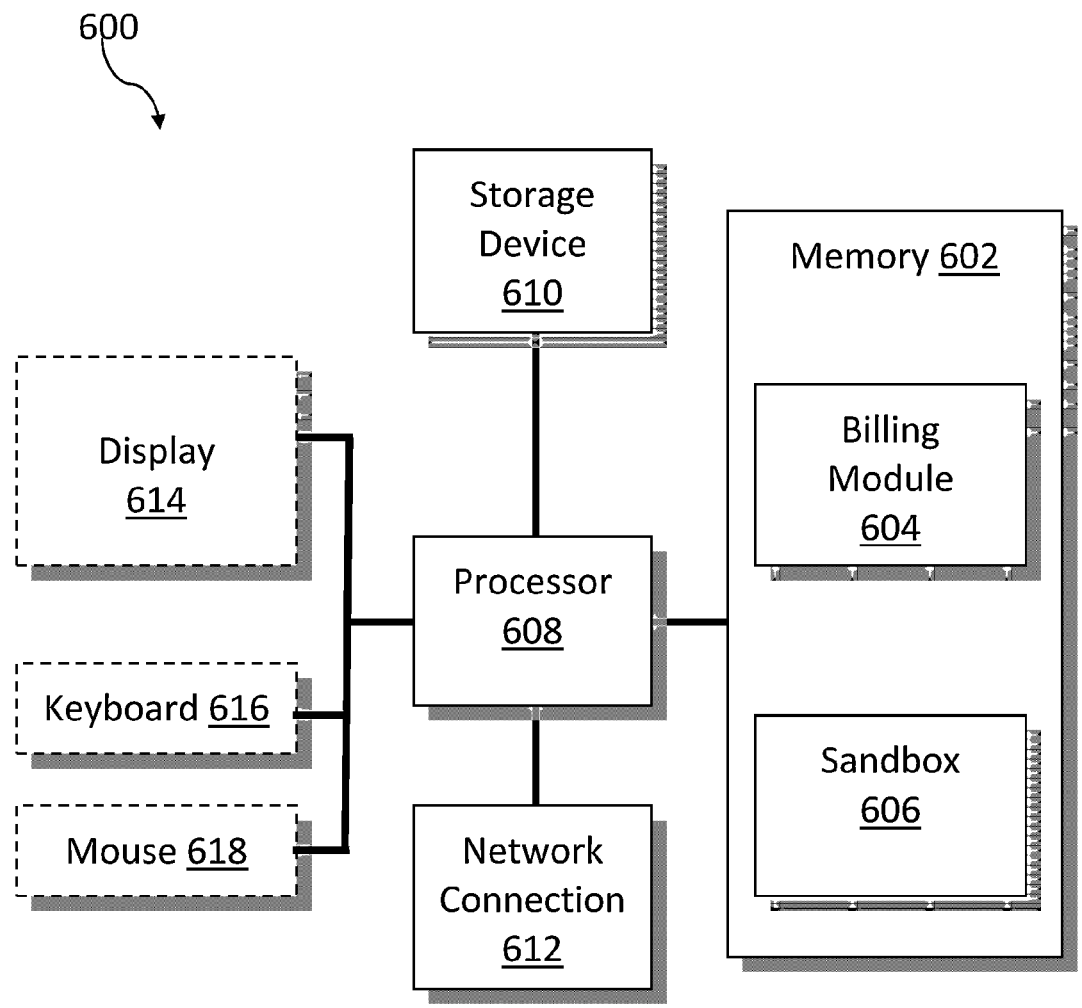

FIG. 6 illustrates an exemplary computer system 600 for executing a billing module 602. The system includes a memory 604 for storing computer instructions associated with the billing module 602 as well as for storing the one or more sandboxes 606. The system may further include a processor 608 for executing instructions in the memory 604, a storage device 610 for storing data and/or instructions, a network connection 612 for connecting to other systems, and (in some embodiments) a user interface including a display 614, keyboard 616, and mouse 618 (though, in other embodiments, the system 600 is accessible and controllable through the network connection 612 and includes no user interface). The system 600 may include billing methods for all of the product offers and purchases in a billing environment; in other embodiments, multiple systems 600 may be used and the billing methods may be separated, or "sharded," onto different systems 600. For example, a master billing entity may implement its billing method on a first system 600 and a child billing entity may implement its billing method on a second system 600 (and the two systems 600 may communicate to share billing information, measured values, or other information). The billing task may therefore be sharded according to billing entity, customer, and/or resource; billing lines for multiple customers, resources, and/or billing entities may be processed simultaneously on multiple systems without regard for contention of shared resources.

The processor 608 may be a general-purpose CPU, but alternatively may be a CSIC (consumer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the steps of the processes of the invention. The memory 602 may include computer storage media in the form of volatile and/or non-volatile memory such as read-only memory ("ROM") and RAM. A basic input/output system ("BIOS"), containing the basic routines that help to transfer information between elements, such as during start-up, is typically stored in ROM. RAM typically contains an operating system (such as WINDOWS, LINUX, or OS/X), data, and/or program modules that are immediately accessible to and/or presently being operated on by a processing unit. The storage device 610 may be a magnetic disk, solid-state disk, optical disk, FLASH memory, or any array or distributed arrangement thereof. The network connection 612 may be an Ethernet port, wireless interface, fiber-optic interface, or any other such interface.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for billing customers in a multi-tenant billing system, the method comprising:

computationally measuring usage by a customer of resources in a cloud-based computing system;

receiving, from a reseller of the cloud-based computing system, (i) a set of values defining a type of resources offered to the customer and (ii) a billing method comprising executable computer code specifying a procedure for calculating a bill for the usage by the customer;

providing a secure execution environment dedicated to the billing method and within which the billing method is executable without communication with any other billing methods executing in any other secure execution environments;

computationally verifying, in the dedicated secure execution environment, digital signatures associated with the billing method to thereby authenticate the billing method; and executing, using a computer processor, the received executable computer code of the billing method in the dedicated secure execution environment, using the set of values and usage by the customer as input, the received executable computer code comprising instructions to (i) retrieve the measured usage via an application-programming interface to the dedicated secure execution environment and (ii) determine, in the dedicated secure execution environment, a charge to or by the reseller for the usage by the customer.

2. The method of claim 1, further comprising (i) receiving an updated billing method that replaces or modifies the billing method and (ii) executing the updated billing method without interaction from a provider system.

3. The method of claim 1, wherein the digital signature is attached to the billing method by a third party.

4. The method of claim 3, wherein the third party is a parent billing entity operating the multi-tenant billing system.

5. The method of claim 3, wherein the digital signature is associated with an associated security zone in a computer memory that controls access to resources offered to the billing method.

6. The method of claim 1, further comprising measuring usage of a plurality of resources of the cloud-based computing system, wherein the billing method comprises procedures for calculating the bill of usage based on the plurality of resources.

7. The method of claim 1, wherein the sandbox environment has an associated security zone that controls access to the resources offered to the billing method.

8. The method of claim 1, further comprising executing a plurality of billing methods corresponding to a plurality of cloud-based computing systems.

9. The method of claim 1, wherein executing the executable computer code of the billing method to determine the charge to the customer is applicable to a measured usage for a period between a current and a previous invocation of the billing method.

10. The method of claim 1, further comprising:
granting a request to a customer for a purchase of units in exchange for currency; and
charging the customer for use of resources in the units.

11. A system for billing a customer in a multi-tenant billing system, the system comprising:
a computer memory comprising:
  i. a stored set of values defining a type of resources offered to a customer and a stored billing method comprising executable computer code specifying a procedure for calculating a bill for usage of resources in a cloud-based computing system by the customer, the set of values and the billing method being received from a reseller of the cloud-based computing system;
  ii. a secure execution environment dedicated to the billing method and within which the billing method is executable without communication with any other billing methods executing in any other secure execution environments in the memory; and
a computer processor configured for:
  i. measuring usage by the customer of resources in the cloud-based computing system;
  ii. verifying, the secure execution environment, a digital signature associated with the billing method to thereby authenticate the billing method; and
  iii. executing the executable computer code of the billing method in a-the dedicated secure sandbox execution environment, using the set of values and usage by the customer as input, the received executable computer code comprising instructions to retrieve the measured usage via an application-programming interface to the dedicated secure execution environment and determine, in the dedicated secure execution environment, a charge to or by the reseller for the usage by the customer.

12. The system of claim 11, wherein the cloud-based computing system comprises a server or compute node, and wherein the resources comprises random-access memories, central-processing units, or storage space.

13. The system of claim 11, wherein the usage of the resources comprises an amount of random-access memory used, a number of central-processing units used, or an amount of storage space used.

14. The system of claim 11, wherein the computer processor is further configured for (i) receiving an updated billing method that replaces or modifies the billing method and (ii) executing the updated billing method.

15. The system of claim 11, wherein the digital signature is attached to the billing method by a third party.

16. The system of claim 15, wherein the third party is a parent billing entity operating the multi-tenant billing system.

17. The system of claim 15, wherein the digital signature is associated with an associated security zone in the computer memory that controls access to resources offered to the billing method.

18. The system of claim 11, wherein the computer processor is further configured for measuring usage of a plurality of resources of the cloud-based computing system, wherein the billing method comprises procedures for calculating the bill of usage by the customer based on the plurality of resources.

19. The system of claim 11, wherein the secure sandbox environment has an associated security zone that controls access to the resources offered to the billing method.

20. The system of claim 11, wherein the computer processor is further configured for executing a plurality of billing methods corresponding to a plurality of cloud-based computing systems.

21. The system of claim 11, wherein determining the charge to the customer is applicable to a measured usage for a period between a current and a previous invocation of the billing method.

* * * * *